United States Patent
Vogel et al.

(10) Patent No.: US 6,698,308 B2
(45) Date of Patent: Mar. 2, 2004

(54) SHIFT DEVICE FOR A MOTOR VEHICLE TRANSMISSION

(75) Inventors: Jochen Vogel, Stuttgart (DE); Peter Wieltsch, Böblingen (DE)

(73) Assignee: DaimlerChrysler AG, Stuttgart (DE)

( * ) Notice: Subject to any disclaimer, the term of this patent is extended or adjusted under 35 U.S.C. 154(b) by 29 days.

(21) Appl. No.: 10/100,607

(22) Filed: Mar. 18, 2002

(65) Prior Publication Data

US 2002/0129672 A1 Sep. 19, 2002

(30) Foreign Application Priority Data

Mar. 16, 2001 (DE) .......................................... 101 12 698

(51) Int. Cl.⁷ ............................................... B60K 20/00
(52) U.S. Cl. ..................... 74/473.32; 74/335; 74/473.31
(58) Field of Search ............................. 74/335, 473.31, 74/473.32, 473.12

(56) References Cited

U.S. PATENT DOCUMENTS

| 5,099,720 A | * | 3/1992 | Raue ........................... 477/144 |
| 5,419,412 A | * | 5/1995 | Schwab et al. ............. 180/336 |
| 6,073,511 A | * | 6/2000 | Umezawa et al. ........ 74/473.25 |
| 6,076,414 A | * | 6/2000 | Tabata et al. .................. 74/335 |
| 6,120,412 A | * | 9/2000 | Fujinuma ...................... 477/99 |
| 6,360,624 B1 | * | 3/2002 | Sedlmaier et al. ............. 74/335 |
| 6,459,368 B1 | * | 10/2002 | Miller et al. ................ 340/456 |
| 2002/0152827 A1 | * | 10/2002 | Hayashi et al. ............ 74/473.3 |
| 2002/0166399 A1 | * | 11/2002 | Nagasaka et al. .............. 74/335 |

FOREIGN PATENT DOCUMENTS

| DE | 39 24 318 | | 1/1991 |
| JP | 5118414 | * | 5/1993 |
| JP | 617911 | * | 1/1994 |

* cited by examiner

*Primary Examiner*—David Fenstermacher
(74) *Attorney, Agent, or Firm*—Kenyon & Kenyon

(57) ABSTRACT

A shift device for a motor vehicle transmission includes a steering-column shift lever which is movable in two directions arranged orthogonally to one another, the steering-column shift lever being capable of being transferred along the first direction into at least one forward driving position (D) and at least one neutral position (N1 or N2) and along the second direction into positions for successive (sequential) gear selection. To provide a cost-effective shift device, the transmission shift state may be reproduced by an indicator, and the first direction is in the circumferential direction of a steering wheel and includes a reversing position (R), two neutral positions (N1 and N2) and a forward driving position (D) whereas the second direction is essentially in the vehicle longitudinal direction.

10 Claims, 1 Drawing Sheet

SHIFT DEVICE FOR A MOTOR VEHICLE TRANSMISSION

FIELD OF THE INVENTION

The invention relates to a shift device for a motor vehicle transmission.

BACKGROUND INFORMATION

German Published Patent Application No. 39 24 318 describes a shift device for a motor vehicle transmission, the shift device including a steering-column shift lever which is movable in two directions arranged orthogonally to one another, the steering-column shift lever being capable of being transferred along the first direction into at least one forward driving position (D) and one neutral position (N) and along the second direction into positions for successive (sequential) gear selection "+" "−".

There are also various national and regional safety regulations.

Thus, the USA/Federal Government 49 CFR 571.102 applies. This specifies safety regulations for the transmission shift pattern, for the starter interlock and for the transmission braking effect. Furthermore, these regulations set forth the requirements for the transmission shift pattern in order to reduce the probability of shift errors. There is a following requirement for automatic transmissions with regard to the location of the transmission selector lever positions in passenger cars in S3.1.1:

There must be a neutral position between the forward driving positions and the reversing position. If a transmission shift lever fastened to the steering column is used, the movement from the neutral position into the forward position must take place clockwise. If the transmission shift pattern includes a parking position, this must lie at the end, next to the reversing position.

There is a following requirement for automatic transmissions with regard to the marking of the selector lever positions in S3.1.4:

In S3.1.4.1: Subject to the provision in S3.1.4.3, when the transmission shift pattern including a parking position, the marking of the selector lever positions, including the positions in relation to one another and to the selected position, must be indicated visibly to the driver, when one of the following conditions is fulfilled:
 (a) The ignition is in the position in which the transmission can be shifted.
 (b) The transmission is not in the parking position.

In S3.1.4.2: Subject to the regulation in S3.1.4.3, when the transmission shift pattern does not include a parking position, the marking of the selector lever positions, including the positions in relation to one another and to the selected position, must be indicated visibly to the driver at all times, when the ignition is in a position in which engine operation is possible.

In S3.1.4.3: Such information does not have to be indicated when the ignition is in the position which serves only for starting the vehicle.

Furthermore, safety regulation No. 114 "Theft protection" in the USA/Federal Government 49 CFR 571.102 is to be adhered to.

S4.2.1 (a) Subject to the provisions in S4.2.2 (a) and (b), the key locking system, which, according to S4.2, is required in any vehicle having an automatic transmission with a parking position, must, in a test according to the procedure in S5.2, prevent the key from being withdrawn, unless the transmission or the transmission selector lever is locked in the parking position or is locked in the parking position as a direct result of the withdrawal of the key.

S5.2 Test procedure:
 (a) The transmission selector lever is to be set to a position in which it will remain without assistance; this also includes a position between the engagement positions, with the exception of the parking position. An attempt is to be made, in every such transmission selection position, to remove the ignition key from every possible key position.

For Australia, the Australian Federal Government regulation No. 42/03 is to be adhered to with regard to the safety regulations.

Actuating devices are to be found there under point 8:

8.2 Standardized actuating devices for automatic transmissions

All motor vehicles, with the exception of vehicles of class L, which are equipped with an automatic transmission must fulfil the following requirements:

8.2.1 Selector lever position 8.2.1.1 Subject to the specifications in point 8.2.1.3 and in as much as the selector lever sequence includes a parking position, the marking of the selector lever positions, including the relation of the individual positions to one another and to the selected position, must lie within the driver's field of vision, specifically whenever one of the following conditions applies:

8.2.1.1.1 The ignition is in a position in which the transmission can be shifted.

8.2.1.1.2 The transmission is not in the parking position.

8.2.1.2 Subject to the specifications in point 8.2.1.3 and in as much as the selector lever sequence does not include a parking position, the marking of the selector lever position, including the relation of the individual positions to one another and to the selected position, must lie within the driver's field of vision, specifically whenever a driver is sitting on the driver's designated sitting position.

8.2.1.3 Such indications need not appear when the ignition is in the position which is used solely for starting the vehicle.

8.2.2 Gear sequence

The sequence of the transmission selector lever positions must:

8.2.2.1 Include a neutral position which lies between the positions for reversing and forward driving; and, 8.2.2.2 When a parking position is provided, this parking position must lie at the end of the gear sequence, next to the reverse gear.

8.2.3 Transmission selector levers mounted on the "steering column" (MA vehicles only):

The movement of the selector lever from the neutral position into reverse gear must take place clockwise; however, if all the selector lever positions lie on the right of the vertical longitudinal plane through the middle of the steering wheel, the movement of the selector lever from the neutral position into reverse gear must take place anti-clockwise. A device which indicates the selected transmission position must be provided. The movement of the indicator must, in general, lie in the same linear direction or direction of rotation as the movement of the transmission selector lever.

It is an object of the present invention to provide a cost-effective shift device.

SUMMARY

The above and other beneficial objects of the present invention are achieved by providing a shift device as described herein.

One advantage of the shift device according to the present invention is that it may fulfil the conditions of various influential countries and may thus be sold, free of modification, in the various countries and therefore in large quantities.

A further advantage is that space is provided because there is no need for a shift lever on the center console. This space may be utilized for a holder for drink cans/bottles, which, particularly in the United States, is an advantage highly estimated by the customer and, due to the consequently increased vehicle sales, also leads to cost benefits.

As compared with shift devices without an indicator, in which a steering-column shift lever indicates the selected gear by the angular position of the steering-column shift lever, shift-lever locks, such as, for example, a lock which prevents the selection of the parking position at high speeds, may be dispensed with. Further cost benefits are achieved by mechanical locks being dispensed with in this manner.

Further refinements of the present invention which may be brought into agreement with statutory requirements and which are cost-effective. Thus, tipping actuation according to the present invention may be ergonomically beneficial and may be subject to lower mechanical load. At the same time, during tipping actuation it may not be necessary to grasp the steering-column shift lever during shifting, in contrast to abovementioned steering-column shift levers with indicating angular positions. Since slight tipping of the shift lever from one side, in a similar manner to the tipping of a conventional flasher lever, is sufficient for shifting the transmission, the vehicle driver applies only relatively low forces to the shift lever.

By providing an additional switching arrangement, the driver may have a choice of the operating elements in manual gear selection.

Another aspect of the present invention provides the driver a sporty sensation, in that his manual gear selection is executed positively within the engine rotational speed limits.

An upshift limitation which may be more comfortable than the abovementioned positive shift may be used. In the case of such an upshift limitation, the vehicle driver specifies the maximum gear capable of being selected by a shift program. That is to say, even in the manual mode, the transmission selects the optimum gear, but only up to the sequentially predetermined gear.

The foregoing features may be combined, in that a positive shift is assigned to switches arranged on the steering wheel for sequential shifting and a sequential upshift limitation is assigned to the steering-column shift lever. It may also be possible, as required, to assign a sequential upshift limitation to switches arranged on the steering wheel and positive shift to the steering-column shift lever.

The present invention is described in more detail below with reference to an example embodiment illustrated in the drawing.

DETAILED DESCRIPTION

Figure 1:
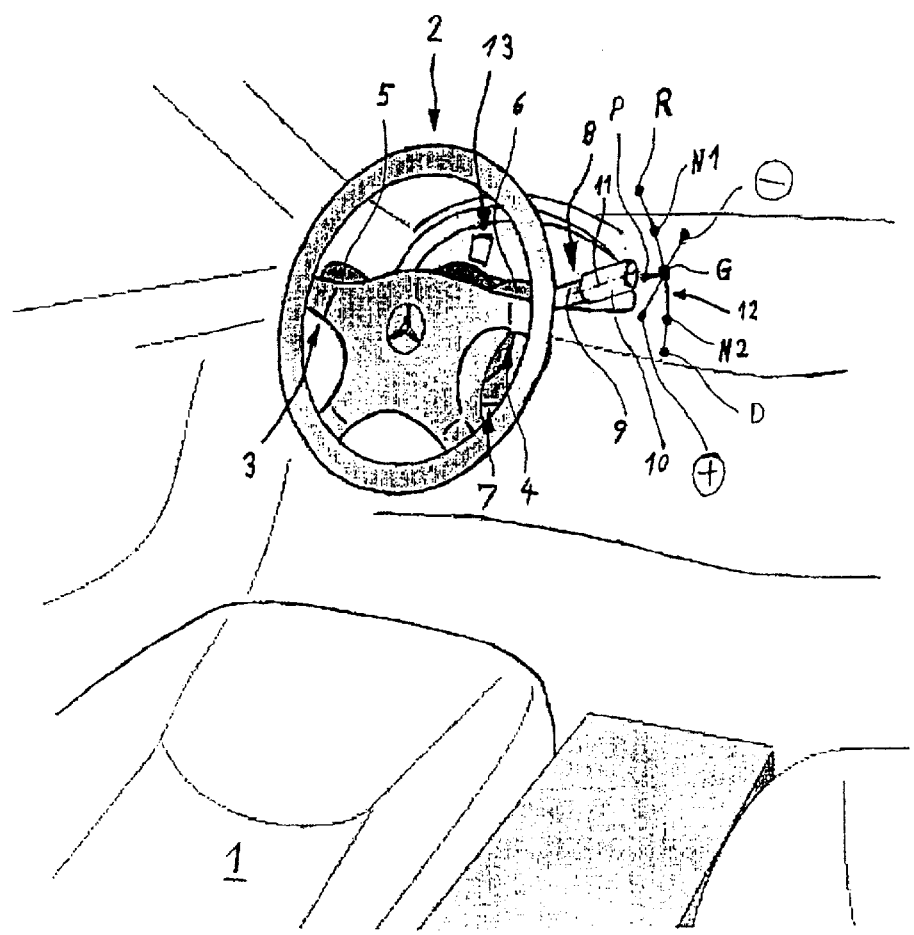
FIG. 1 is a schematic view of a vehicle interior of a motor vehicle with a transmission, which has a parking position.

A vehicle driver sits on a vehicle seat 1. The motor vehicle may be steered by a steering wheel 2. This steering wheel 2 includes steering-wheel spokes 3, 4, on which two switches 5, 6 are arranged in the region of a two-third position. By these switches 5, 6, the transmission may be shifted in succession, e.g., sequentially. The steering wheel 2 is arranged rotatably relative to a steering column 7 in the usual manner. A spring-centered steering-column shift lever 8 is arranged on that side of the steering column 7 which is on the right in the direction of travel. This steering-column shift lever 8 includes, inter alia, a carrier tube 9 and a handpiece 10 arranged displaceably relative to the latter and is arranged pivotably about two pivot axes. The steering-column shift lever 8 is pivotable about the first pivot axis approximately in the circumferential direction. The steering-column shift lever is pivotable about the second pivot axis approximately in the direction of travel of the motor vehicle. A handpiece 10 is longitudinally displaceable in the two end positions with respect to the carrier tube 9 in the longitudinal direction 11 of the latter. These two end positions are a stable basic position G, which lies centrally on an arcuate path 12, and an unstable parking position P. That is, the handpiece 10 is displaceable out of the basic position G in the direction pointing towards the steering column 7 and, when released, automatically returns, as a result of spring force, from the unstable parking position P to the spring-centered basic position G.

Furthermore:
an unstable reversing position R,
an unstable first neutral position N1,
an unstable second neutral position N2, and
an unstable forward driving position D are arranged clockwise on the arcuate path 12.

The steering-column shift lever 8 is pivotable out of the stable basic position G, counter to a linearly increasing spring force, selectively into the first neutral position N1 or into the second neutral position N2. As a result of two prestressed spring elements, an appreciably higher force may have to be overcome in order to transfer the steering-column shift lever 8 from the first neutral position N1 into the reversing position R or from the second neutral position N2 into the forward driving position D. Such overcoming of an abruptly rising force is also designated as "pressing over". The respective positions N1 and N2 are effectively transmitted as a shift command to the transmission control by electronics only when the selected position is selected from the direction of the basic position. That is, automatic pivoting out of the reversing position R or the forward driving position D back into the basic position G does not lead to the shift command "select neutral position" when the respective neutral position N1 or N2 is crossed.

As a result of actuation into the forward driving position D, a shift program is called up which initiates an automated gear selection of the transmission for forward driving.

The steering-column shift lever 8 is pivotable out of the basic position G arranged between the two neutral positions N1, N2, in the direction pointing forwards from the vehicle driver in the direction of travel, into a decrease position "−", in order to change from the shift program for the automated gear selection of the transmission into a manual sequentially shiftable mode. The steering-column shift lever 8 is pivotable in the opposite direction, e.g., backwards, into an increase position "+", in order to change from the shift program for the automated actuation of the transmission into a manual sequentially shiftable mode. During this position change for discontinuing the shift program, the next higher gear to the gear currently selected in the transmission is selected, when the steering-column shift lever 8 is pulled in the direction pointing backwards. By contrast, during the position change for discontinuing the shift program, the next lower gear to the current gear is selected when the steering-column shift lever 8 is pressed in the direction pointing forwards. Any further actuation backwards/forwards leads to a further increase/decrease of the gear in the transmission.

The switches 5, 6 on the steering-wheel spokes 3, 4 fulfil the same function as the decreased position "−" and the increased position "+" on the steering-column shift lever. That is, when actuated, these switches 5, 6 lead, as an alternative to the steering-column shift lever 8, to a discontinuation of a shift program, a decrease of the gear or an increase of the gear.

In this case, the switch located on the left in the direction of travel is assigned to a decrease of the gear, whereas the switch located on the right is assigned to an increase of the gear.

An indicator panel 13 is arranged in a dashboard region visible to the vehicle driver. This indicator panel reproduces visually the transmission shift state stored in the transmission control. This transmission status is represented in the indicator panel as "R" for reversing, "N" for neutral, "D" for automatic gear selection predetermined by the shift program, a "P" for the selected parking position, and a "1", "2", "3", "4", "5", "6" for the gear step selected manually in each case.

A pictogram, e.g., a graphical symbol, is displayed, visibly to the vehicle driver, on the handpiece and illustrates the arcuate path 12 illustrated in FIG. 1 and the other possible directions of movement of the handpiece with the positions R, N1, G, N2, D, "+", "−", P.

The vehicle is put into operational readiness, via so-called "keyless-go", by an inductively evaluatable card. An engine is started by a starting knob. Stopping of the engine is possible by renewed actuation of the starting knob only when the parking position is selected in the transmission. When the vehicle driver or, with him, the card leaves the vehicle, the vehicle driver is visually and acoustically advised to actuate the handpiece 10 into the parking position.

In an alternative example embodiment of the present invention, in countries where stopping the engine is admissible both in the neutral position N and in a parking position P, the vehicle may additionally be configured with the possibility of stopping in N.

In a further example embodiment of the present invention, an engine may be started by a conventional ignition key. In this case, the ignition lock is in signal exchange with the transmission shift, so that, when the ignition key is withdrawn, the parking position automatically assumes the locking position, e.g., is selected, inasmuch as a relatively low limit speed is fallen short of.

The transmission may be configured both as an automatic planetary transmission, as an automated countershaft transmission and as a continuously variable transmission. Where a continuously variable transmission is concerned, a sequential selection of the gears is also appropriate for ergonomic reasons. Furthermore, however, in such continuously variable transmissions, continuous adjustment may also be predetermined, which is set by "+" and "−" on the steering-column shift lever or on the switches located on the steering-wheel spokes.

Instead of with positive sequential shiftability, both the switches on the steering-wheel spokes and the shift position of the steering-column shift lever in the second direction may be configured as upshift limitation. In the case of such upshift limitation, the vehicle driver specifies the maximum gear capable of being selected by a shift program. That is, the transmission selects the optimum gear even in the manual mode, but only up to the sequentially predetermined gear.

In a further example embodiment of the present invention, the steering-column shift lever may also be assigned to the positive upshifts/downshifts and the switches located on the steering-wheel spokes to upshift limitation. Furthermore, conversely, the switches located on the steering-wheel spokes may be assigned to positive upshifts/downshifts and the steering-column shift lever to upshift limitation.

The pivoting center of the steering-column shift lever is freely selectable within the framework of the ergonomic requirements. Thus, the pivoting center of the arcuate path does not have to have the same pivoting center as the steering wheel. These two pivoting centers may deviate from one another for ergonomic or mechanical reasons. The pivoting center of the first direction, e.g., the arcuate path, may also deviate from that of the second direction, e.g., between the decrease position "−" and the increase position "+".

In addition to the unstable P position illustrated in the example embodiment, this may also be configured as a stable position. That is, the handpiece, when pressed in the direction of the steering wheel, engages and is released again only when pressed again. Instead of the handpiece, a P switch may also be arranged at the end of the carrier tube for the purpose of actuating the P position.

Depending on the shift philosophy, "+" may also be arranged on the left and "−" on the right on the steering-wheel spokes. Likewise, on the steering-column switch, "+" may also be arranged at the front in the direction of travel and "−" at the rear in the direction of travel.

The example embodiments described are merely illustrative. A combination of the features described for different example embodiments is also possible. Further features of the device parts belonging to the present invention may be gathered from the geometries, illustrated in the drawings, of the device parts.

What is claimed is:

1. A shift device for a transmission of a motor vehicle, comprising:

a steering-column shift lever movable in two directions arranged substantially orthogonally to one another, the steering-column shift lever configured to be transferred along a first one of the two directions into at least one forward driving position and at least one neutral position and along a second one of the two directions into positions corresponding to successive gear selection; and an indicator configured to reproduce a transmission shift state;

wherein the first one of the two directions is arranged in a circumferential direction of a steering wheel and includes a reversing position, two neutral positions and the forward driving position, and the second one of the two directions is arranged substantially in a longitudinal direction of the motor vehicle.

2. The shift device according to claim 1, wherein the reversing position, the two neutral positions and the forward driving position are unstable, and wherein the reversing position followed clockwise by a first neutral position, a stable basic position, a second neutral position and the forward driving position.

3. The shift device according to claim 2, further comprising:
a centering device configured to transfer the steering-column shift lever out of an unstable operating state into the basic position; and
a parking-position switch configured to be actuated on the steering-column shift lever in the basic position.

4. The shift device according to claim 3, wherein the centering device includes at least one of a spring device and an electric motor.

5. The shift device according to claim 3, wherein the parking-position switch includes a component configured to be displaced with respect to a longitudinal axis of the steering-column shift lever.

6. The shift device according to claim 5, wherein the component includes at least one of a handpiece and a shift knob.

7. The shift device according to claim 5, wherein a parking position of the parking-position switch is unstable.

8. The shift device according to claim 1, further comprising an additional switching arrangement arranged on the steering wheel configured for successive gear selection.

9. The shift device according to claim 1, further comprising an arrangement configured for successive gear selection positively within engine rotational speed limits.

10. The shift device according to claim 1, wherein the successive gear selection includes an upshift limitation.

* * * * *